Patented Jan. 2, 1945

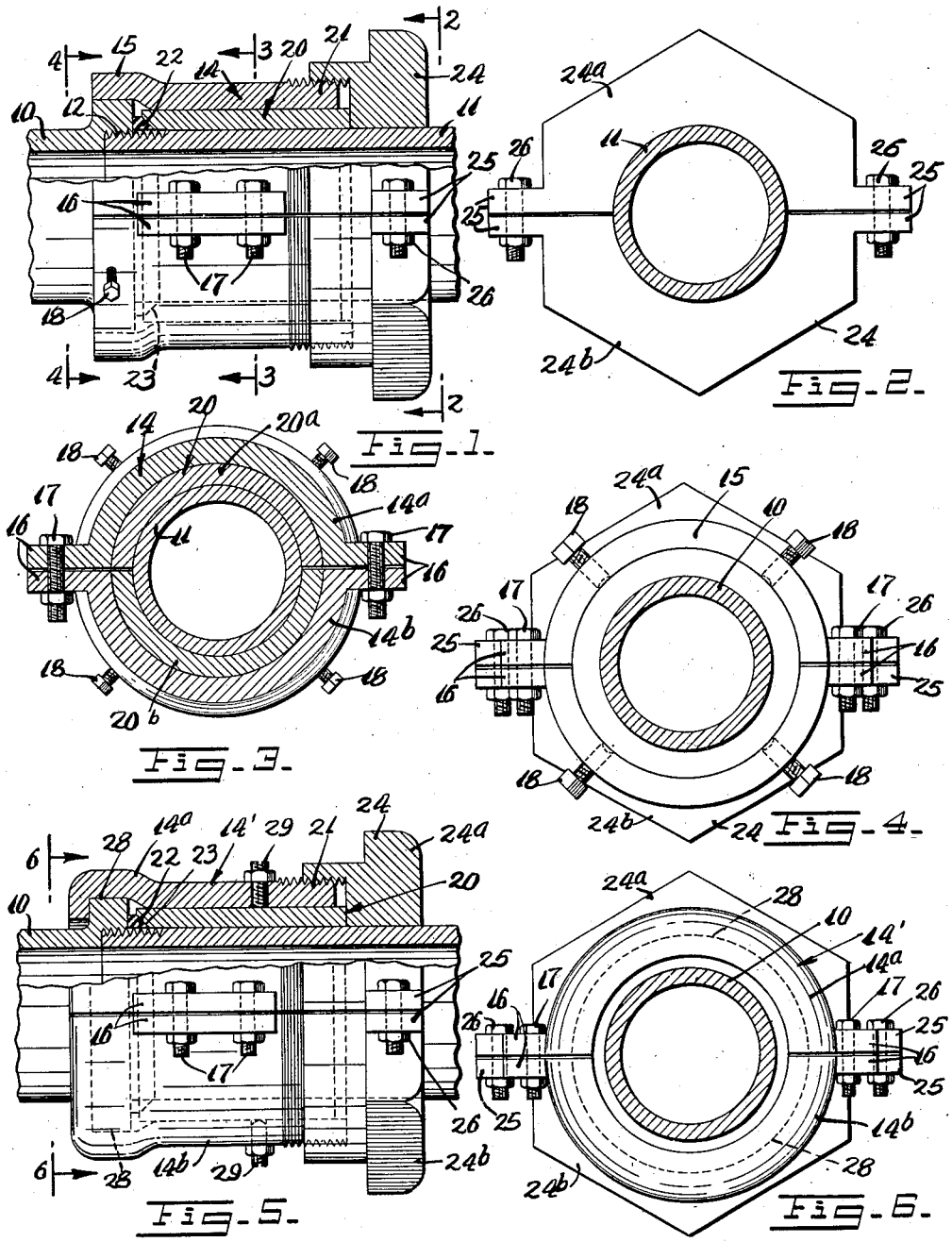

2,366,341

UNITED STATES PATENT OFFICE 2,366,341

STOP LEAK PIPE JOINT CLAMP

David Lappin, Long Island City, N. Y.

Application February 26, 1944, Serial No. 523,974

3 Claims. (Cl. 285—119)

This invention relates to new and useful improvements in a stop leak pipe joint clamp.

More particularly, the invention proposes an improved clamp, as mentioned above, for the purpose of stopping leaks in threaded pipe joints. Quite often in the field, a leak develops in a threaded pipe joint. This invention proposes a longitudinally slit outer tube adapted to be mounted at its front on the outer pipe of the joint and to extend over a section of the inner pipe of the joint, and means for fixedly securing said outer tube on the end of said outer pipe. A longitudinally split inner tube is also proposed within said outer tube and extending from the back end of the outer tube. Packing material may be disposed against the end of the outer pipe and against the inner front end of the inner pipe. A nut is then threadedly mounted on the back end of the outer tube and engages the outer back end of the inner tube for clamping said packing material against said pipe joint.

With the above construction it is a simple matter to mount the joint clamp upon a threaded pipe joint in a way so as to stop the leak.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a fragmentary side elevational view of a threaded pipe joint and a stop leak pipe joint clamp mounted thereon in accordance with this invention, portions of the parts being broken away to disclose interior parts.

Fig. 2 is a sectional view taken on the line 2—2 of Fig. 1.

Fig. 3 is a transverse sectional view taken on the line 3—3 of Fig. 1.

Fig. 4 is a transverse sectional view taken on the line 4—4 of Fig. 1.

Fig. 5 is another side elevational view of a threaded pipe joint with a stop leak pipe joint clamp mounted thereon in accordance with this invention, said parts being broken away to disclose interior construction.

Fig. 6 is a transverse sectional view taken on the line 6—6 of Fig. 5.

The stop leak pipe joint clamp, in accordance with this invention, is used upon a threaded pipe joint essentially consisting of an outer pipe 10 and an inner pipe 11. The outer pipe 10 is formed with internal threads which are engaged by the external threads 12 of the pipe 11. A longitudinally split outer tube 14 is adapted to be mounted at its front end 15 on the outer pipe 10 and extends over a section of the inner pipe 11 of said threaded pipe joint. This outer tube 14 is constructed from half sections 14a and 14b which are provided with side flanges 16 secured with bolts and nuts 17.

The outer tube 14 is associated with means for fixedly securing it upon the end of said outer pipe 10. This means comprises several set screws 18 or other clamping and holding screws threadedly engaged through the material of the outer tube 15 and abutting the flange of the pipe 10. A longitudinally split inner tube 20 is disposed within said outer tube 14 and extends from the back end 21 of said outer tube. This inner tube 20 is formed from half sections 20a and 20b. These half sections are not directly connected with each other. However, they are held together by the fact that they are engaged within the outer tube 14.

Packing material 22 is disposed against the end of the outer pipe 10 and against the inner front end of the said inner tube 20. The front end of the inner tube 20 is formed with a beveled portion 23 which acts to compress the packing material 22 when the inner tube 20 is forced frontwards.

A nut 24 is threadedly mounted on the back of the outer tube 14 and engages the outer back end of said inner tube 20 for clamping said packing material 22 against said pipe joint. The nut 24 is formed from a pair of half sections 24a and 24b which are provided with flanges 25, and bolts and nuts 26 engaged through these flanges for holding the half sections together.

The operation of the stop leak pipe joint is as follows:

The pipe joint clamp may be mounted upon a pipe line 10, 11 in the field without disconnecting the pipe sections and may act to stop a leak between the pipe sections. The half sections of the outer tube 14 are opened by removing the bolts and nuts 17. The half sections of the nut 24 are opened by loosening the bolts and nuts 26. In this condition of the parts they may be easily slipped about the pipe line 10, 11. The parts are then reassembled and tightened, and finally the nut 24 is drawn tight so as to move the inner tube 20 forwards, compressing the packing material 22 and thus stopping the leak.

In Figs. 5 and 6 a modified form of the invention has been disclosed which is very similar to the prior form, distinguishing in the means for securing the outer tube 14' on the end of the outer pipe 10. This means is in the form of an annular groove 28 formed in the front end of the outer tube 15 and adapted to engage over the flange of the pipe 10. The half section 14a and 14b of the outer tube 14' are associated with set screws 29 and lock nuts by which the sections 14a and 14b may be forced outwards so as to supplement the holding action of the nut 24. The extra strain prevents the nut 24 from vibrating loose, which would reopen the leak.

In other respects this form of the invention is similar to that previously shown and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A stop leak pipe joint clamp for a threaded pipe joint, comprising a longitudinally split outer tube adapted to be mounted at its front on the outer pipe and extend over a section of the inner pipe of a threaded pipe joint, means for fixedly securing said outer tube on the end of said outer pipe, a longitudinally split inner tube within said outer tube and extending from the back end of said outer tube, packing disposed against the end of said outer pipe and against the inner front end of said inner tube, and a nut threadedly mounted on the back end of said outer tube for clamping said packing material against said pipe joint.

2. A stop leak pipe joint clamp for a threaded pipe joint, comprising a longitudinally split outer tube adapted to be mounted at its front on the outer pipe and extend over a section of the inner pipe of a threaded pipe joint, means for fixedly securing said outer tube on the end of said outer pipe, a longitudinally split inner tube within said outer tube and extending from the back end of said outer tube, packing disposed against the end of said outer pipe and against the inner front end of said inner tube, and a nut threadedly mounted on the back end of said outer tube and engaging the outer back end of said inner tube for clamping said packing material against said pipe joint, said means for securing outer tube on said outer pipe, comprising an internal groove formed in the front end of the outer tube and engaging the flange of the outer pipe.

3. A stop leak pipe joint clamp for a threaded pipe joint, comprising a longitudinally split outer tube adapted to be mounted at its front on the outer pipe and extend over a section of the inner pipe of a threaded pipe joint, means for fixedly securing said outer tube on the end of said outer pipe, a longitudinally split inner tube within said outer tube and extending from the back end of said outer tube, packing disposed against the end of said outer pipe and against the inner front end of said inner tube, and a nut threadedly mounted on the back end of said outer tube, engaging the outer back end of said inner tube for clamping said packing material against said pipe joint, and said screws and nuts being threadedly engaged through the sections of said outer tube and abutting said inner tube for forcing the sections of the outer tube outwards against the threads of said nut.

DAVID LAPPIN.